United States Patent [19]
Nash

[11] Patent Number: 4,603,531
[45] Date of Patent: Aug. 5, 1986

[54] STRUCTURAL PANELS

[76] Inventor: Henry R. Nash, 171 Walnut Ave., Arcadia, Calif. 91006

[21] Appl. No.: 675,925

[22] PCT Filed: Nov. 19, 1983

[86] PCT No.: PCT/US83/00403
§ 371 Date: Nov. 19, 1984
§ 102(e) Date: Nov. 19, 1984

[87] PCT Pub. No.: WO84/03728
PCT Pub. Date: Sep. 27, 1984

[51] Int. Cl.[4] .............................................. E04C 2/34
[52] U.S. Cl. ...................................... 52/806; 52/826; 52/274; 52/238.1
[58] Field of Search ................. 52/806, 710, 711, 707, 52/826, 825, 274, 293, 809, 794, 782, 785, 238.1, 239, 701

[56] References Cited
U.S. PATENT DOCUMENTS
3,055,460  9/1962  Maroney ............................... 52/293

FOREIGN PATENT DOCUMENTS

| 231671 | 2/1964 | Austria .................................. 52/806 |
| 2210819 | 9/1973 | Fed. Rep. of Germany ..... 52/238.1 |
| 1188880 | 9/1959 | France ................................ 52/238.1 |
| 209529 | 10/1964 | Sweden ................................ 52/806 |
| 365856 | 5/1963 | Switzerland ......................... 52/806 |
| 900427 | 7/1962 | United Kingdom ............... 52/238.1 |
| 903039 | 8/1962 | United Kingdom ............... 52/238.1 |
| 1266225 | 3/1972 | United Kingdom ................. 52/806 |

Primary Examiner—Carl D. Friedman
Assistant Examiner—Naoko N. Slack
Attorney, Agent, or Firm—Norman E. Carte

[57] ABSTRACT

Improved Structural Panels for use in the construction industry capable of withstanding greater compressive and shear forces than those presently available. This increased capacity to withstand vertical loading allows the Structural Panels to be used in multi-story buildings.

The Structural Panel is comprised of facings 1 and 2, a honeycomb core 3, two vertical support 4 and 5, and a horizontal support 6. Glue is used to hold the assembly together and to provide for the even distribution of compressive forces. Nails, screws, or glue are used during construction to secure the panels to each other and to the framework of the building structure.

4 Claims, 9 Drawing Figures

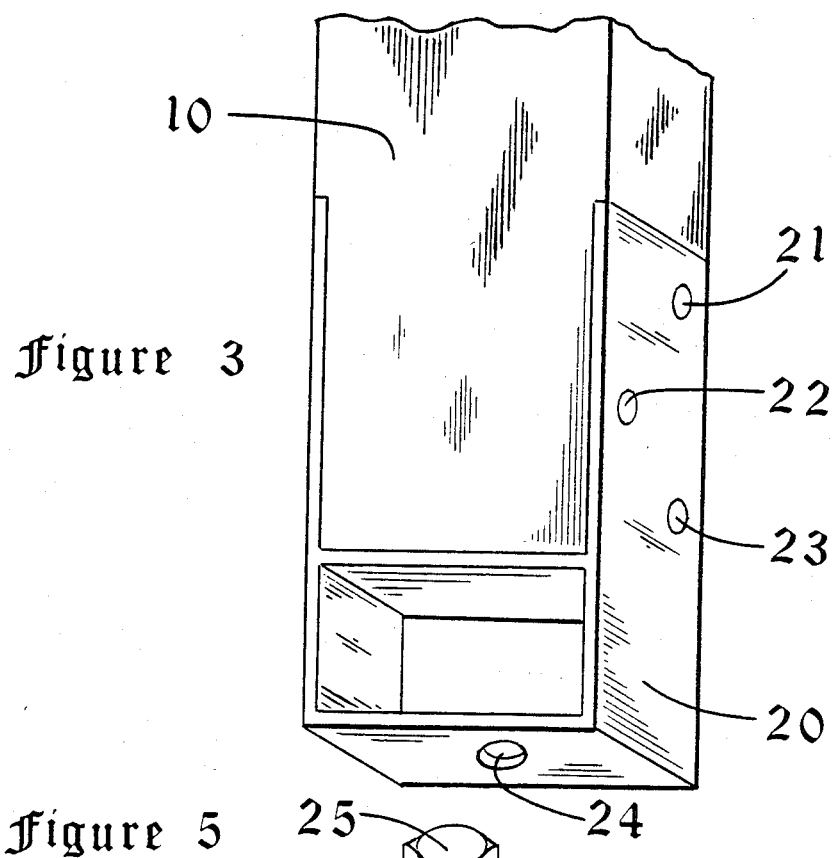
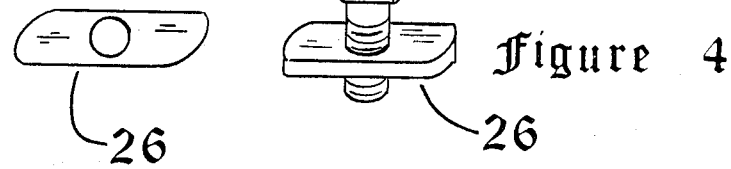
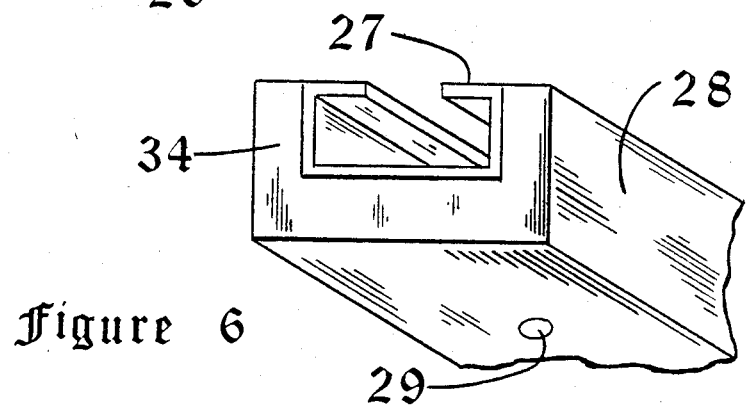

Figure 7
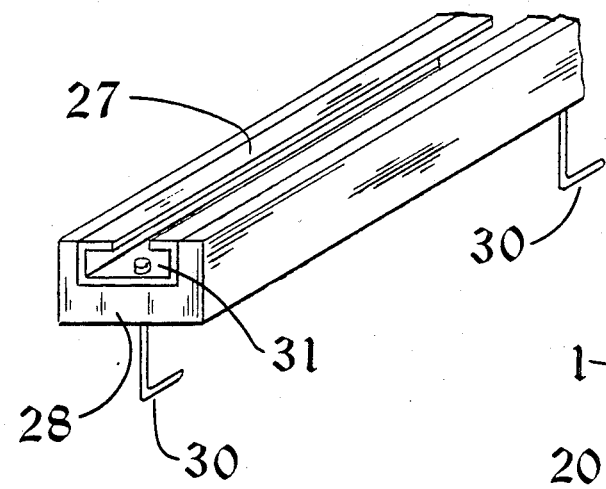
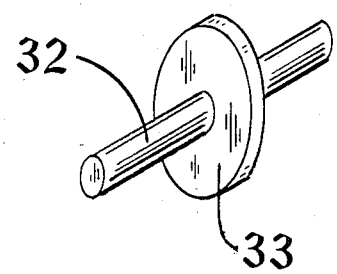
Figure 8
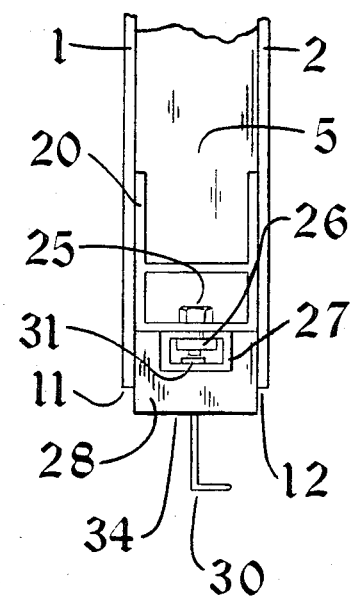
Figure 9

STRUCTURAL PANELS

TECHNICAL FIELD

This invention relates to an improvement in prefabricated structural panels and more particularly to such panels having a honeycomb core used as structural units in the building industry.

BACKGROUND ART

Structural panels, generally consisting of a honeycomb core covered on the front and back with facings such as plywood are well known. The facings, both front and back, are nailed during the construction process to the vertical studs of the building structure. They are likewise nailed to the wood base plate and to upper plates which are installed during construction. The honeycomb core, usually made a resin impregnated heavy paper gives the panel structural strength and is commonly glued to the front and back sheets.

The core also provides thermal and acoustic insulation and may be utilized to support additional insulation. Insulating material, such as cellulose fiber, may be deposited in the cavities of the cellular core. Any type of insulation can be used including plastic foams and mineral fiber.

The honeycomb core gives strength to the panel by keeping the front and back facings parallel, thereby preventing them from flexing under the compressive forces of the weight they support.

Such structural panels lack the strength necessary to provide structural support to multi-story buildings. They are typically difficult to install properly and lack the flexibility required for on-site modification such as would be required to add windows or doors.

Also, the allowed capacities of such panels to withstand the structural loads imposed upon them is presently determined by the number of nails fastening the panels to the studs and plates of the building frame. Although panels which are both nailed and glued together consistently withstand vertical testing loads of 40,000 pounds (18,144 kilograms) per panel, the building codes will only allow the nailing schedule to determine the allowable vertical loading. With the maximum practical nailing schedule of 2 'inches (5 centimeters) between nails around the perimeter of each panel, the allowed load is only 12% of the test load. The building codes recognize only the load limit of a panel with nails alone even though the assembly can utilize both glue and nails to attach the panels to the framing members. They will recognize the load values for glued assemblies only if no nails are used. This invention will allow the utilization of the full strength of the panel as given by actual experimental test results.

A prior art search did not disclose any patents for structural panels which provide increased strength, ease of installation, and flexibility in use, in the manner of this invention. The following U.S. patent documents were considered in the investigation and evaluation of the prior art relative to this invention.

| U.S. Pat. No. | INVENTOR | ISSUE DATE |
| --- | --- | --- |
| 2,809,403 | Clements | 15 October 1957 |
| 2,893,076 | Herts | 7 July 1959 |
| 3,616,139 | Jones | 26 October 1971 |
| 3,665,662 | Timbrook | 30 May 1972 |

-continued

| U.S. Pat. No. | INVENTOR | ISSUE DATE |
| --- | --- | --- |
| 3,970,502 | Turner | 20 July 1976 |

The Clements patent discloses a structural panel primarily for use as a door. It utilizes a honeycomb core. It is concerned mainly with a method of obtaining maximum strength from the honeycomb core but is not particularly concerned with vertical loading. Specifically, it does not approach the problem of vertical stresses in the manner of the present invention.

The Herts patent discloses structural panels having a honeycomb core which are intended primarily as doors or table tops.

The Jones patent discloses multilayered thermal insulators which utilize multiple honeycomb structures and is primarily concerned with the insulating properties of the panel.

The Timbrook patent discloses a structural panel utilizing a honeycomb core. It is primarily concerned with providing a method of interconnecting the panels to facilitate on-site construction with prefabricated panels.

The Turner patent discloses a structural panel having a foam core. It is primarily concerned with preventing delamination of the outer coverings from the core and with providing an improved latching method for interconnecting panels.

All the above mentioned panels lack the structural strength required to withstand the vertical stresses of use in multi-story buildings. They do not lend themselves to easy on-site modification and they present a comparatively high degree of difficulty in their installation.

DISCLOSURE OF THE INVENTION

The object of this invention is to provide a Structural Panel having improved strength characteristics to allow the use of such panels in multi-story buildings.

Another object of this invention is to provide a prefabricated Structural Panel which can be easily modified on-site to allow for doors and windows.

Yet another object of this invention is to provide a Structural Panel which is comparatively easier to install than those in current use.

Those objects are attained through the use of structural adhesive to attach the facing panels to the frame of the structural panel and through the construction of structural panels having their lower edges pre-aligned so as to provide the proper clearance between themselves and the foundation. This pre-alignment of the panel's lower edges also cause the panel to be properly positioned vertically. Imbedded I-beam header construction in one embodiment of this invention allows that embodiment to be modified to contain openings for doors or windows without lowering the vertical load capacity of the structural panel.

The materials used in panel construction vary. The facings may made of plywood, waferboard, particle board, metal sheet, gypsum board, or other structural siding. The horizontal members and vertical supports may be made of wood, sheet metal channels, rectangular metal tubing, or other structural materials.

A pin assembly provides a means of connecting the structural panels to each other. The provides improved shear strength which makes the panel significantly more resistant to loads such as those introduced by earthquakes.

These Structural Panels may be nailed, screwed, or glued to the foundation plate. An alternate method of attaching the panels to the foundation plate is provided where a bracket on the bottom of one of the panel's vertical supports has a bolt passing through its lower surface and into a section of metal channel in the foundation plate. The bolt is secured into the channel with an elongated nut in the manner commonly used to secure structure to such types of channel. The channel may be embedded in a wood foundation plate to provide a higher resistance to heat flow than would be afforded if the channel were not embedded in a wood foundation plate. A channel may be used without a wood foundation plate in applications where heat flow through the channel would not be detrimental.

BRIEF DESCRIPTION OF THE DRAWINGS

FIG. 3 is a perspective view of the mount bracket as it is attached to the lower end of a vertical support.

FIG. 4 is a perspective view of the bolt and elongated nut which attach the mount bracket to the channel in the foundation plate.

FIG. 5 is a top view of the elongated nut of FIG. 4.

FIG. 6 is a fragmentary perspective view of the foundation plate containing the section of channel.

FIG. 7 is a perspective view of the foundation plate of FIG. 6 showing the anchor bolts.

FIG. 8 is a perspective view of the pin.

FIG. 9 is a side view of the mount bracket showing the attachment of the panel's vertical support to the foundation plate.

BEST MODE FOR CARRYING OUT THE INVENTION

Figure 1:
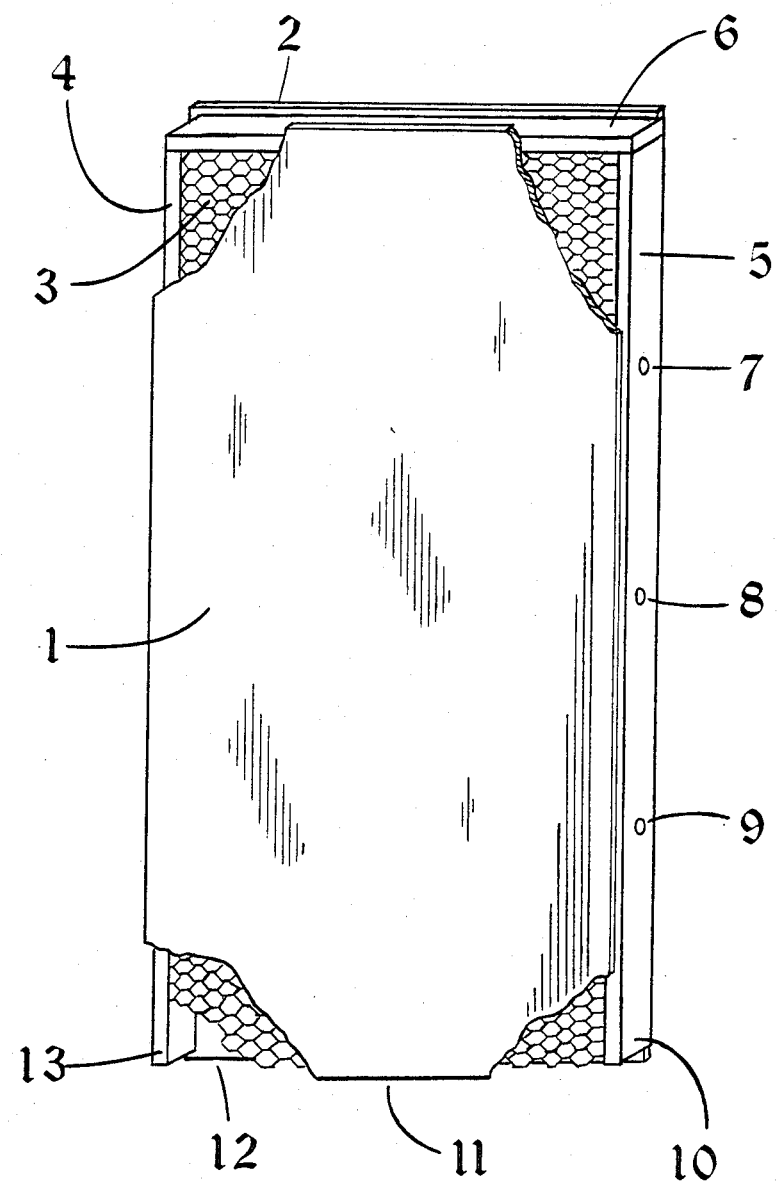
FIG. 1 is a fragmentary perspective front view of the basic structural panel.

As can be seen in FIG. 1, two vertical supports 4 and 5 and an upper horizontal member 6 are glued to each other and glued to two covering sheets referred to as sheets of plywood 1 and 2. The frame does not include a member along the bottom of the unit. The gluing provides for even distribution of the vertical loading, thereby allowing the structural panel to support much greater weight than it otherwise could.

An inner core of honeycomb paper 3 is glued to the inner surfaces of each sheet of plywood 1 and 2. The honeycomb core 3 provides additional structural strength because it prevents the plywood sheets 1 and 2 from flexing under vertical loading.

The lower edges 11 and 12 of the plywood sheets 1 and 2 extend downward beyond the lower ends 10 and 13 of the vertical support members of the frame 4 and 5. This allows the lower edges 11 and 12 of the plywood sheets 1 and 2 to rest just above the level of the buildings foundation when the lower ends 10 and 13 of the vertical support members 4 and 5 rest upon the foundation plate. This is important because it prevents the plywood sheets 1 and 2 from contacting the foundation where they may absorb water which may result from spills or mopping. This prealignment of the lower edge of the plywood sheets 11 and 12 relative to the foundation greatly simplifies installation of the Structural Panels. Panels presently in use must be held in place with the proper clearance between their lower edge and the foundation while they are interconnected.

The vertical supports 4 and 5 are positioned relative to the two sheets of plywood 1 and 2 so as to provide a tongue and groove vertical mating surface which facilitates simplified panel installation and forms a weatherproof joint between panels.

Holes 7, 8, and 9 are provided in both of the vertical support members 4 and 5. A pin arrangement is shown in FIG. 8 which utilizes these holes 7, 8, and 9 to connect the structural panels to each other. The pin 32 fits into one of the holes 7, 8, or 9 on one of the vertical support members 4 or 5 and into a corresponding hole on an adjacent structural panel.

Figure 2:
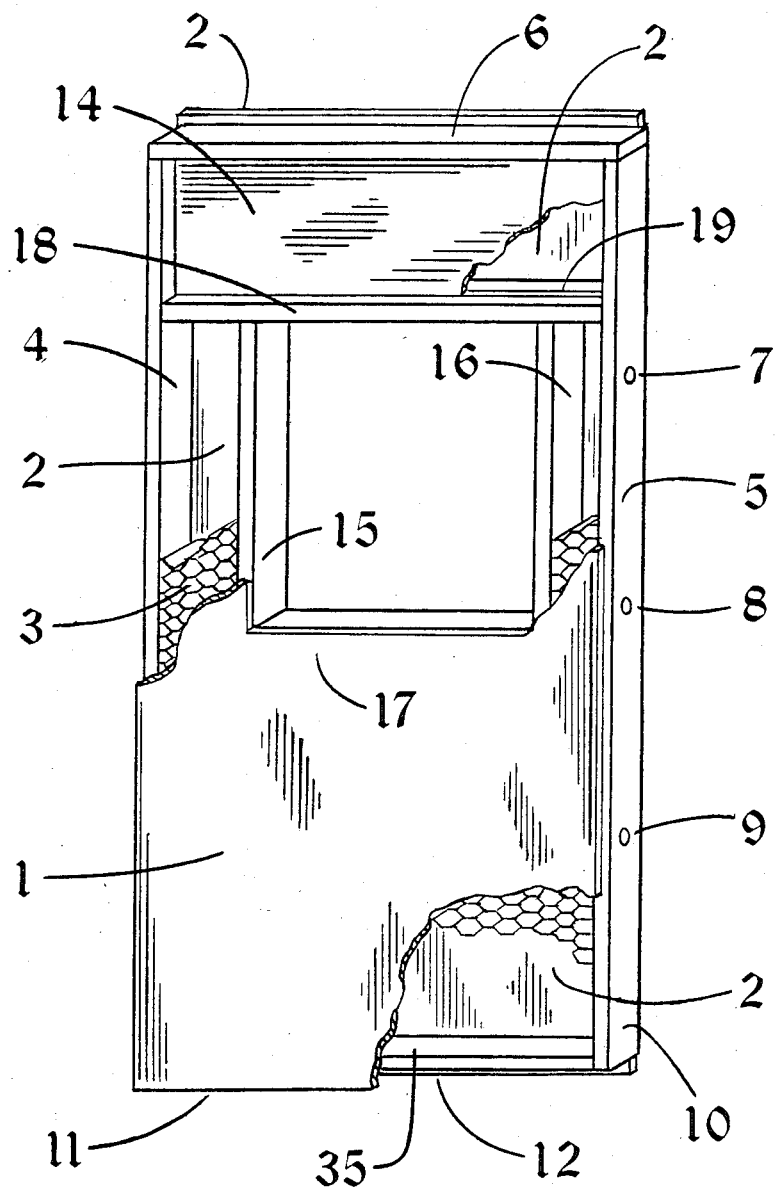
FIG. 2 is a fragmentary perspective front view of the structural panel having an I-beam header.

As shown in FIG. 2, a cross-member 18 and inside sheet of plywood 14 provide structural support for overhead loads in order to allow this embodiment of the structural panel to have an opening for a window or door cut into it. Members 15, 16, and 17 are the framework of a window in this embodiment.

The inside sheet of plywood 14 fits into a slot 19 in the cross member 18. A slot is likewise provided in the upper horizontal member 6 and both vertical supports 4 and 5. The inside sheet of plywood 14 is glued into each of the slots provided forming a structural I section. The slots may be offset toward the weaker of the facings if two different thicknesses of plywood are used.

A lower horizontal member 35 may be used to add strength to this embodiment of the Structural Panel.

In use, the Structural Panels as described are placed upon the foundation plate which generally consists of a wood two by four secured to the foundation of a building. A first panel can be nailed to the foundation plate and then successive panels nailed to the first panel as well as the foundation plate as they are installed. Then a top plate, generally a two-by-four, is placed along the tops of the Structural Panels, laying upon the top of the upper horizontal member 6, and nailed in place. When required, two top plates may be installed along the top of the panels to resist high building stresses. If metal plates are used, self tapping screws may be used as fasteners.

FIG. 3 shows an alternate method of attaching the Structural Panels to the foundation plate. A mount bracket 20 is attached to the lower end 10 of a wood vertical support 5 with glue or nails through holes 21, 22, and 23. If metal vertical supports are used, the bracket 20 would be an integral part of the support. One such mount bracket 20 can be used on the right vertical support of each panel to secure that panel to the foundation plate. Since the right vertical support 5 of one panel is directly adjacent to the left vertical support 4 of the panel to its right, only one mount bracket 20 is required for each panel. That single mount bracket 20 therefore actually secures two panels to the foundation plate because the adjacent panels are secured to each other.

A bolt 25 extends through the hole 24 in the bracket 20. An elongated nut 26 engages the bolt 25 as shown in FIG. 4.

The bolt 25 extends into a section of channel 27 within the foundation plate 28 shown in FIG. 6. The elongated nut 26, as shown in the top view of FIG. 5, will enter the channel if oriented along its longitudinal axis and then will turn to prevent its retraction when the bolt 25 is tightened.

FIG. 7 shows the foundation plate 28 with the channel 27. Also shown are the anchor bolts 30 by which the foundation plate 28 is secured to the foundation. A hole 29 (as shown in FIG. 6) in the foundation plate 28 is provided for the anchor bolts 30. The head of an anchor bolt 30 can be seen extending through the foundation plate 28 in FIG. 7.

FIG. 9 shows the Structural Panel secured to the foundation plate 28. Note that the lower edges 11 and 12 of the plywood facings 1 and 2 are slightly higher that that lower surface 34 of the foundation plate 28. The lower surface 34 of the foundation plate 28 rests upon the foundation. The lower edges 11 and 12 of the plywood facings 1 and 2 are kept above the lower surface 34 of the foundation plate 28 to prevent the plywood facings 1 and 2 from absorbing water which may be present upon the foundation as described above. The distance between the lower edges 11 and 12 of the plywood facings 1 and 2 and the lower surface 34 of the foundation plate should be approximately 1 centimeter (⅜ inch).

FIG. 8 show the pin 32 having a washer 33. Pins may be inserted into the holes 7, 8, and 9 in the vertical supports 4 and 5 to give the connected Structural Panel greater shear strength. The washer 33 allows the pin 32 to be inserted to the proper depth.

I claim:

1. A structural panel for use in the building industry utilizing foundation plates comprising:
   (a) two vertical support members having upper and lower ends,
   (b) an upper horizontal member secured to said two vertical support members with glue,
   (c) a covering sheet on either side of said vertical support members and said upper horizontal member, attached to said vertical support members and said horizontal member with glue said covering sheet on either side extend downward beyond the lower ends of the vertical support members such a distance that when the lower ends of the vertical support members rest upon the foundation plate the lower ends of the covering sheets are approximately one centimeter (⅜ inch) above the foundation, and
   (d) a honeycomb core which is glued to both of said covering sheets.

2. A structural panel for use in the building industry utilizing foundation plates comprising:
   (a) two vertical support members having upper ends and lower ends each having one or more holes through which pins may be inserted,
   (b) an upper horizontal member secured to said two vertical support members with glue,
   (c) a crossmember between said vertical supports,
   (d) a lower horizontal member disposed between the lower ends of said vertical support members,
   (e) a mount bracket attached to the lower ends of said vertical support member creating a bottom surface,
   (f) a section of channel embedded into said foundation plate, and a plurality of nuts and bolts attaching said mount bracket to said section of channel,
   (g) a covering sheet on either side of side vertical support members and said upper horizontal member, attached to said vertical support members and said horizontal member with glue, said covering sheet on either side extend downward beyond the lower ends of the vertical support members such a distance that when the lower ends of the vertical support members rest upon the foundation plate the lower ends of the covering sheets are approximately one centimeter (⅜ inch) above the foundation,
   (h) a honeycomb core glued to both of said covering sheets, and
   (i) a plurality of pins within said holes to secure one structural panel to another structural panel.

3. A method of constructing structural panels for use in the building industry utilizing foundation plates, which comprises the steps of:
   (a) gluing two vertical support members to an upper horizontal member forming a structure having a first and second side with an upper and lower end;
   (b) gluing a first covering sheet to the first side of the two vertical support members and the horizontal member;
   (c) gluing a honeycomb core to the first covering sheet;
   (d) gluing a second covering sheet to the second side of the two vertical support members and the horizontal member and to the honeycomb core said first and second covering sheets are glued to said two vertical supports such that their lower surfaces extend downward beyond the lower ends of the vertical support members such a distance that when the lower ends of the vertical support members rest upon the foundation plate the lower ends of the covering sheets are approximately one centimeter (⅜ inch) above the foundation.

4. A method for constructing Structural Panels according to claim 3 further comprising the step of drilling one or more holes in the two vertical support members to accommodate one or more pins for connecting one Structural Panel to another Structural Panel.

* * * * *